SEMICONDUCTOR LEAD WIRE HANDLING

Filed July 22, 1963 6 Sheets-Sheet 1

INVENTOR:
HARRY W. SCHMITZ,
BY Robert J. Mooney
HIS ATTORNEY.

INVENTOR:
HARRY W. SCHMITZ,
BY Robert J. Mooney
HIS ATTORNEY.

April 5, 1966 H. W. SCHMITZ 3,244,040

SEMICONDUCTOR LEAD WIRE HANDLING

Filed July 22, 1963 6 Sheets-Sheet 3

INVENTOR:
HARRY W. SCHMITZ,
BY Robert J. Mooney
HIS ATTORNEY.

SEMICONDUCTOR LEAD WIRE HANDLING

Filed July 22, 1963 6 Sheets-Sheet 4

INVENTOR:
HARRY W. SCHMITZ,
BY
HIS ATTORNEY.

INVENTOR:
HARRY W. SCHMITZ,
BY Robert J. Mooney
HIS ATTORNEY.

SEMICONDUCTOR LEAD WIRE HANDLING

Filed July 22, 1963 6 Sheets-Sheet 6

INVENTOR:
HARRY W. SCHMITZ,

BY Robert J. Mooney
HIS ATTORNEY.

United States Patent Office 3,244,040
Patented Apr. 5, 1966

3,244,040

SEMICONDUCTOR LEAD WIRE HANDLING

Harry W. Schmitz, Syracuse, N.Y., assignor to General Electric Company, a corporation of New York Filed July 22, 1963, Ser. No. 296,728
10 Claims. (Cl. 83—23)

The present invention relates to a method of and apparatus for high-speed precision wire handling for facilitating the bonding of conducting leads to semiconductor pellets.

The rapidly expanding electrical and electronics fields present an ever-increasing demand for reliable, low-cost semiconducting devices and have generated a highly competitive field in the production and manufacture of these solid state devices. The relatively minute size of these devices, however, requires the performance of intricate and delicate operations in their manufacture, thereby necessitating a relatively high cost to the customer.

In the production of semiconductor devices such as transistors utilizing tiny members of semiconductor material having extremely small electrical contact regions, one of the most delicate operations required to be performed is the electrical attachment or bonding of electrically conducting leads to the various contact regions. As an illustration of the minute dimensions involved, the contact regions on a semiconducting pellet of an individual transistor to which conducting leads are to be bonded, such as the base and emitter contact regions, may be of the order of a fe w(four or five) mils in a given dimension. The conducting leads which are to be connected to these contact regions may comprise extremely fine wire of the order of one mil in diameter and approximately 60 to 80 mils in length. In the manufacture of such devices, the employment of mass production techniques to reduce manufacturing cost has been hampered seriously due to such minute dimensions of the contact regions on the pellets and of the conducting leads, the fragility of the parts, and the need for uniformly precise relative positioning of parts to be joined so as to provide desired mechanical and electrical reliability. Even in some of the more advanced techniques presently employed in the semiconductor industry, a great deal of human operator manipulation of the conducting leads is required to achieve the necessary precise coincidence of contact regions and leads to be joined. In one specific arrangement the human operator causes a wire to be protected through a hollow quartz tube for an appropriate distance and then positions the end of the wire adjacent the semiconductor pellet. In sequence, the operator then bonds the wire to an appropriate region of the semiconductor pellet and finally cuts the wire to a desired length. Usually conducting leads must be provided on two regions of the semiconductor pellet. Therefore, the pellet and its header assembly must be manipulated by the operator to suitably locate the other region to permit the bonding of a conducting lead thereto. Such operator manipulation is costly in terms of both manipulation time required, and operator fatigue leading to errors and reduced quality.

It is, therefore, an object of the present invention to provide an improved method and apparatus for increasing the speed, uniformity, and quality of operator-aided attachment of leads to semiconductor devices such as transistors.

Another object of this invention is to provide an improved method and apparatus for high-speed, precision dispensing and locating of electrode leads of predetermined length for bonding to semiconductor pellets.

It is another object of this invention to provide a method of high-speed precision wire handling for supplying conductor leads of a predetermined length and for supporting the conductor leads adjacent appropriate regions of a semiconductor pellet for bonding thereto.

A further object of this invention is to provide a high-speed precision wire handling machine which substantially reduces the amount of human manipulaion involved in properly locating on a semiconductor pellet the attachable ends of wire leads for attachment thereto.

It is a still further object of this invention to provide a high-speed precision wire handling machine for facilitating the manufacture of semiconductor devices with reduced direct labor and minimized operator fatigue.

These and other objects of the present invention will become apparent as the following description proceeds and the features of novelty will be pointed out with particularity in the claims annexed to and forming a part of this application.

In accordance with the method of this invention, a predetermined length of wire is withdrawn from a lead wire source and cut therefrom, the predetermined length of wire being firmly grasped at one or more points prior to the cutting operation. Once cut, the predetermined length of wire is automatically transported subsequently to a bonding station where it is automatically properly oriented adjacent the surface of a semiconducting pellet for bonding thereto. In the practice of this method, a plurality of predetermined lengths of wire may be cut from the wire source in a single operative step and simultaneously transported to the bonding station where they are supported at desired angles relative to the surface of the semiconductor pellet for bonding thereto. Further, in accordance with this invention, there is provided a machine for effecting the method of the invention, the machine comprising a wire supply apparatus including a clamping and cutting mechanism and a transport mechanism. For each semiconductor pellet to which leads are to be bonded, the clamping and cutting mechanism provides a plurality of segments of lead wire, one for each lead and properly cut to predetermined length, which wire segments are then automatically transferred by the transport mechanism from the wire supply apparatus to a bonding station. The transport mechanism includes grapsing means which is moved between the wire supply apparatus and the bonding station, the grasping means being actuated to grasp the predetermined lengths of wire at the wire supply apparatus and being actuated to release the predetermined lengths of wire at the bonding station following bonding of the wires to the semiconductor pellet. Means are provided for rotating the grasping means to position the predetermined length of wire at a desired angular disposition relative to the surface of the semiconductor pellet, thereby facilitating the bonding operation and providing conducting leads conveniently positioned for further manufacturing operations, such as bonding to terminals on a header assembly.

For a better understanding of the invention, reference may be had to the following detailed description and drawings of one illustrative embodiment of a machine incorporating the method of the invention in which.

Figures 1, 3:
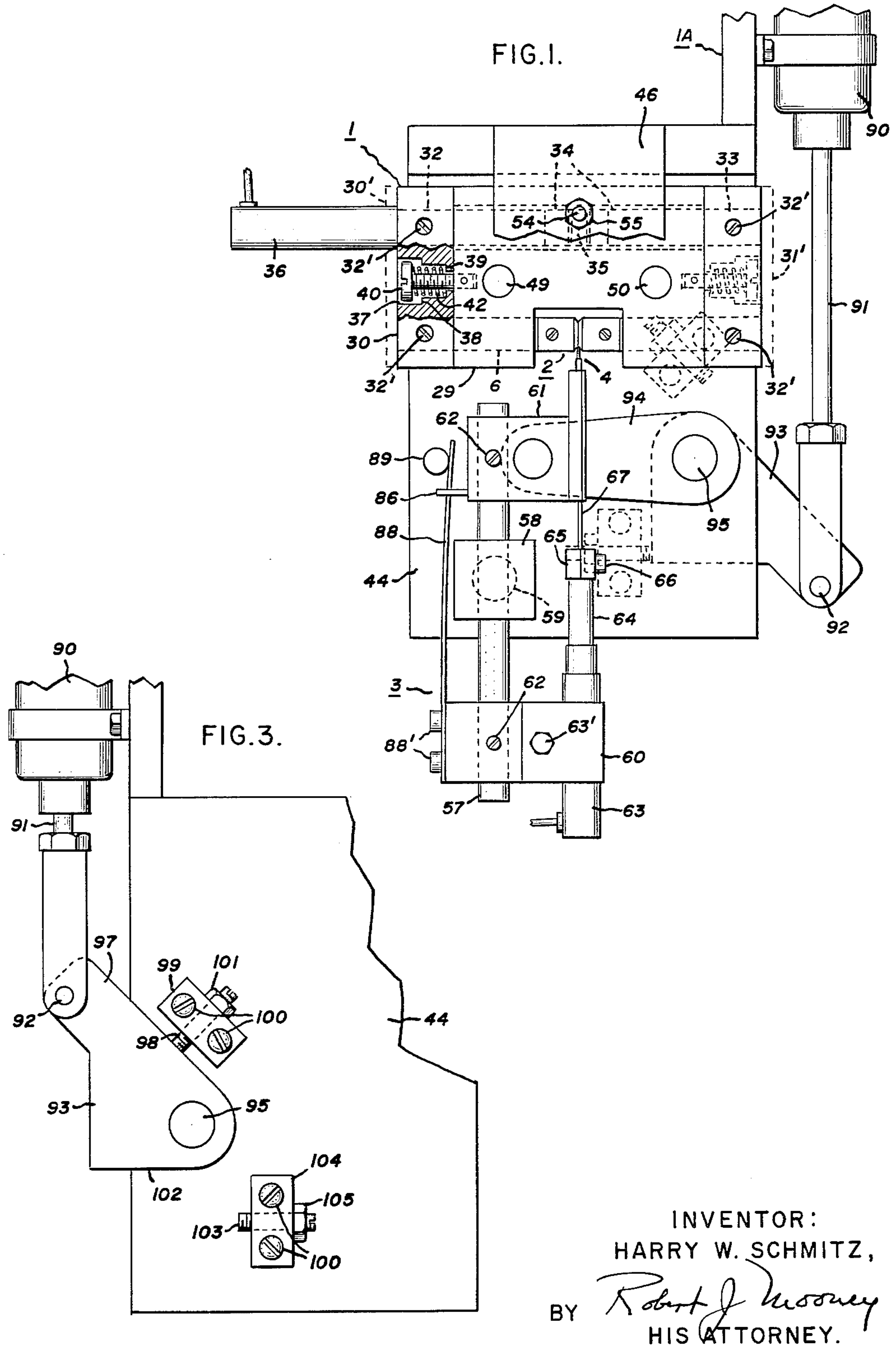
FIG. 1 is a fragmentary left elevation view of a machine constructed in accordance with my invention showing the wire supply apparatus and the transport mechanism in a first position.
FIG. 3 is a fragmentary right elevation view of the machine of FIG. 1.
Figure 11:
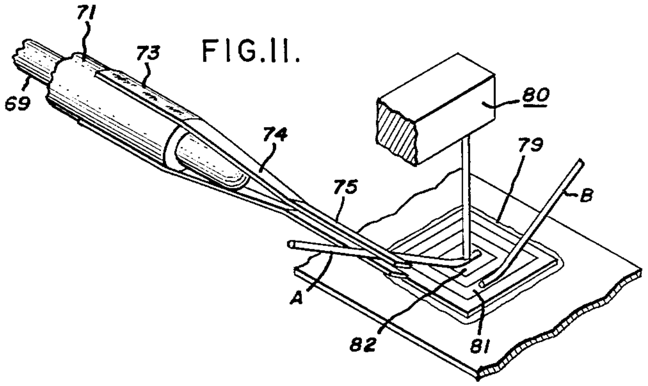
Figures 4, 5:
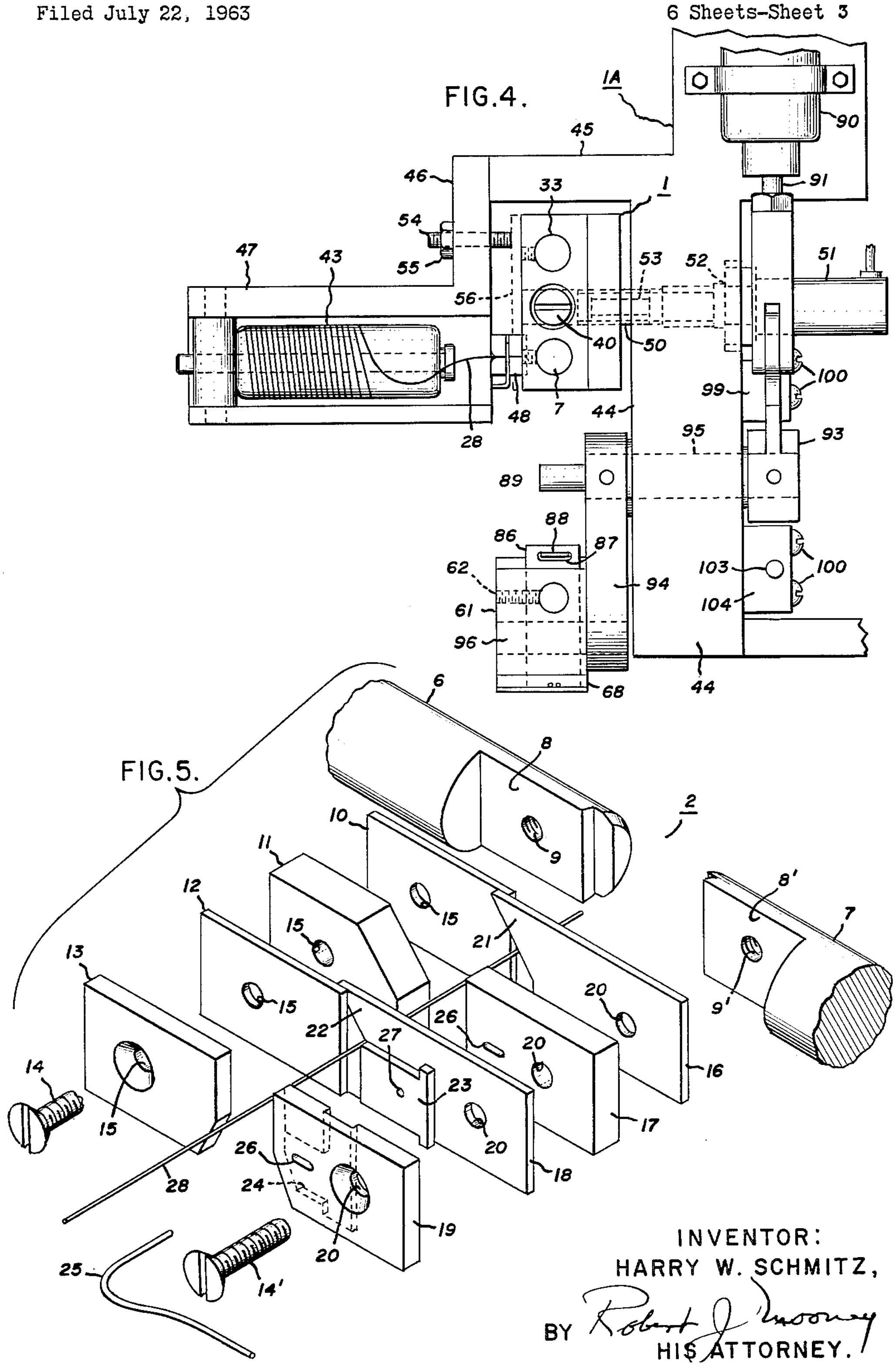
FIG. 4 is a fragmentary plan view taken from FIG. 2 showing in further detail the wire supply apparatus.
FIG. 5 is an enlarged exploded view of the wire clamping and cutting portion of the structure of FIG. 1.
Figure 7:
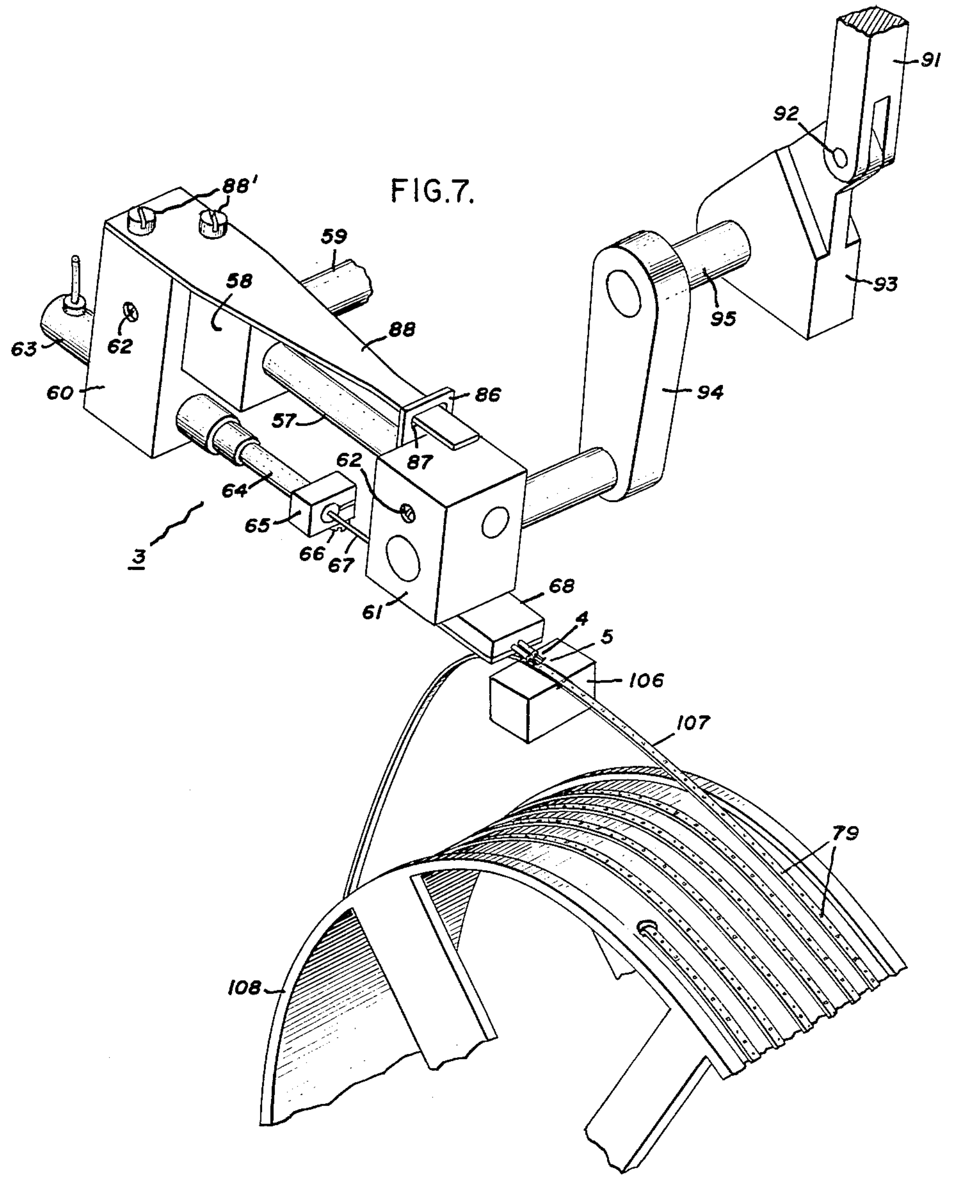
Figure 9:
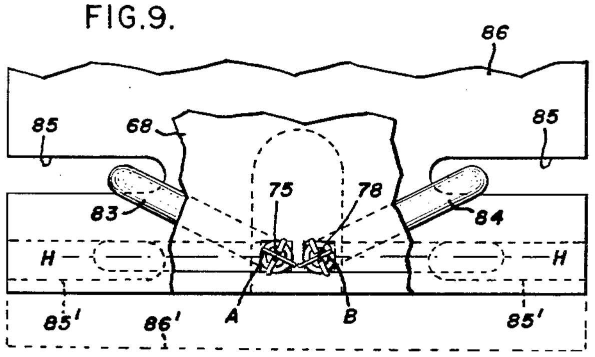
Figure 8A:
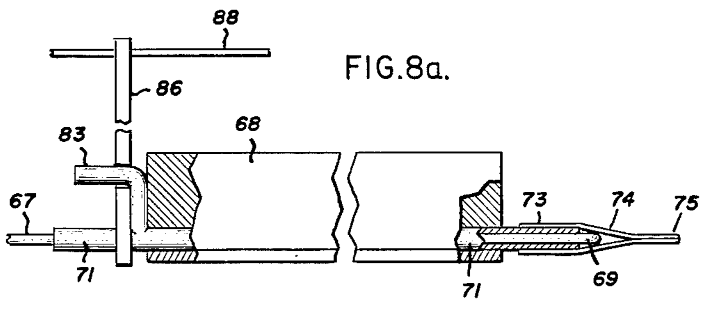
Figures 8B, 8C:
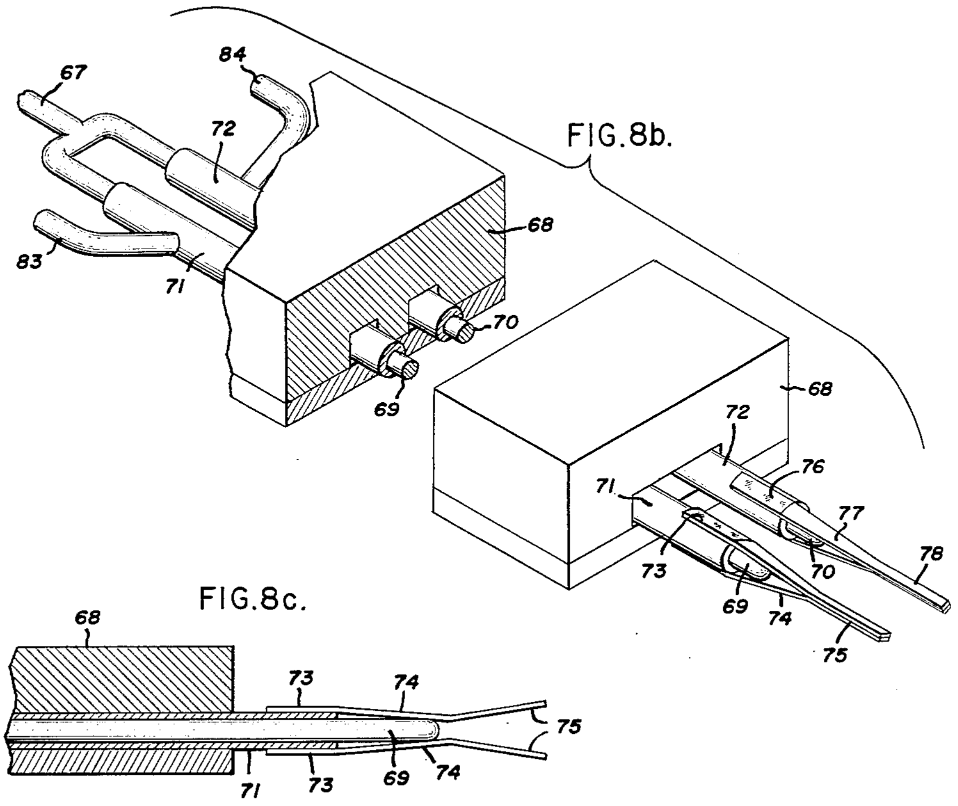
Figure 10:
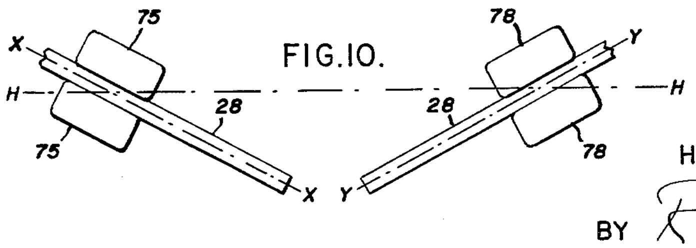

FIGS. 6*a* through 6*d* are enlarged fragmentary sectional views of the clamping and cutting mechanism of FIG. 5 in several sequential positions thereof;

FIG. 7 is a detailed fragmentary perspective view of the transport mechanism portion of the structure of FIG. 1;

FIG. 8*a* is an enlarged fragmentary sectional view of the grasping means portion of the structure of FIG. 1, in a closed condition, FIG. 8*b* is an enlarged fragmentary perspective view of a portion of the grasping means in an open condition, and FIG. 8*c* is an enlarged sectional view of a portion of the structure of FIG. 8*b*;

FIG. 9 is an enlarged fragmentary front view of part of the structure of FIG. 8*a*, showing the mechanism for rotating the grasping means thereof;

FIG. 10 is a greatly enlarged fragmentary view of the grasping means shown in FIG. 9; and FIG. 11 is an enlarged perspective view showing the grasping means supporting a predetermined length of wire adjacent a semiconducting element in properly oriented relation for bonding thereto.

GENERAL SUMMARY

Figure 2:
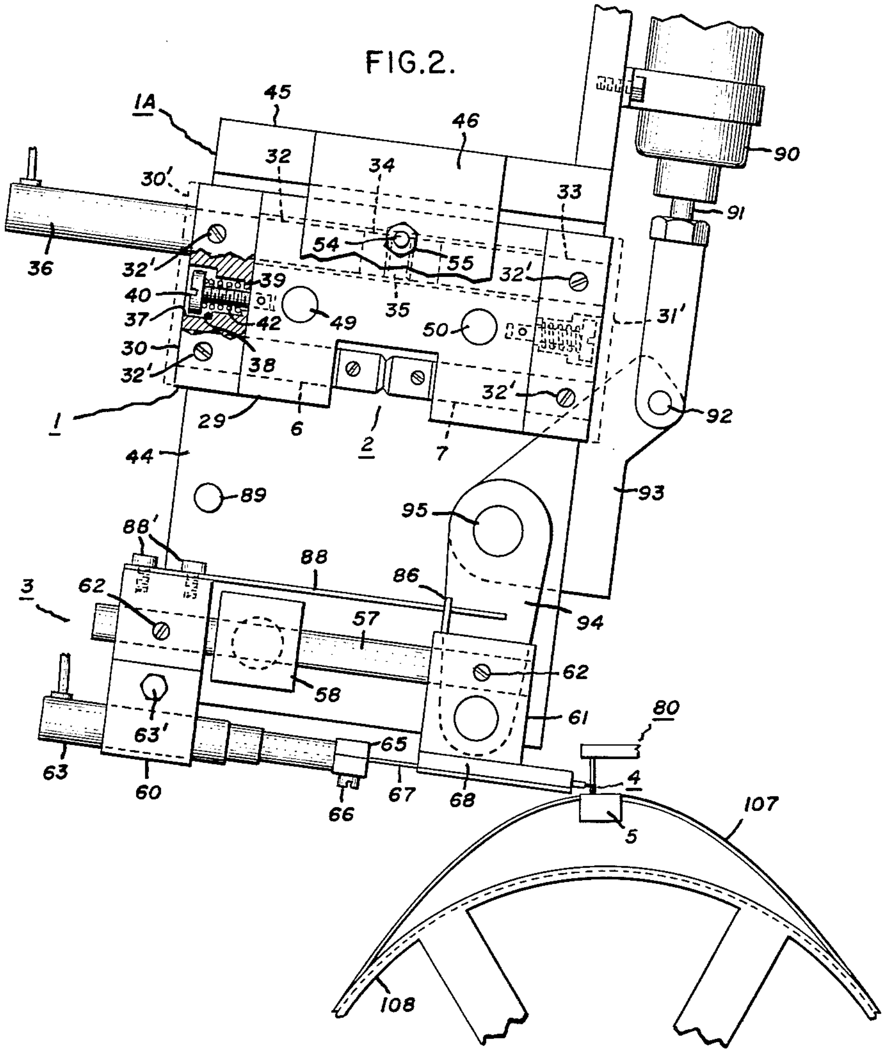
FIG. 2 is a fragmentary left elevation view of the machine of FIG. 1 showing the transport mechanism in a second position.

Referring to FIG. 1, a lead wire handling machine constructed according to my invention is seen to include a frame 1A on which is mounted a laterally reciprocable carriage 1 which carries a longitudinally reciprocable clamping and cutting mechanism 2. Transport mechanism 3, including grasping means 4, has been actuated to position the grasping means 4 adjacent the clamping and cutting mechanism 2 for grasping a predetermined length of wire withdrawn and cut from a wire source by the clamping and cutting mechanism 2. In FIG. 2 the transport mechanism 3 has been actuated to position the grasping means 4 adjacent the bonding station 5, the grasping means 4 supporting the predetermined length of wire at the bonding station 5 for the subsequent bonding operation. In the following portions of this specification, the various components of the machine will be described in detail, concluding with an explanation of the sequence of interrelated operations of these components.

WIRE SUPPLY APPARATUS

*Clamping and cutting mechanism.*—The clamping and cutting mechanism, generally indicated as the element 2 in FIGS. 1 and 2, is shown in an exploded and enlarged view in FIG. 5. A left holder 6 and a right holder 7 are provided, having planar surfaces 8 and 8′, and threaded apertures 9 and 9′, respectively, for mounting purposes. A cutting blade 10, a spacer 11, a second cutting blade 12, and a front plate 13 are mounted on the planar surface 8 of the left holder 6 by screw 14 which passes through the apertures 15 provided in the elements 10 through 13 and is received within the threaded aperture 9. Similarly, cutting blade 16, spacer 17, cutting blade 18 and front plate 19 are mounted on the planar surface 8 of right holder 7 by screw 14′ which passes through the apertures 20 provided in the elements 16 through 19 for reception within the threaded aperture 9′ of the right holder 7. The cutting blades 16 and 18 are arranged for shearing engagement with the cutting blades 10 and 12, respectively. The cutting blades 16 and 18 are provided with extending tapered portions 21 and 22, which remain in engagement with the cutting blades 10 and 12, respectively, at all times to assure proper alignment of the cutting blades for shearing interengagement.

The clamping and cutting mechanism 2 is further provided with a wire clamping element 23 which is positioned within a channel 24 provided in the face plate 19 and arranged for sliding movement therein to provide lost motion. The wire clamping element 23 is maintained normally in the forward, or extended position by a spring 25 which is received in opening 27 in clamp 23 and extends through elongated apertures 26 provided in the face plate 19, the cutting blade 18, and the spacer 17 for sliding movement therein. The opposite end of the spring 25 is fixedly mounted within a suitable aperture provided in the right holder 7, as shown in FIGS. 6*a*–6*d*.

Figure 6D:
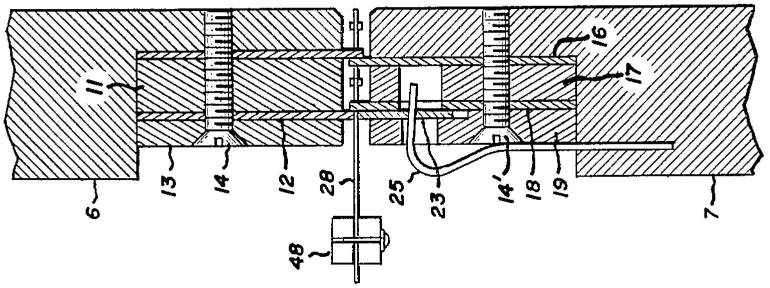
Figure 6C:
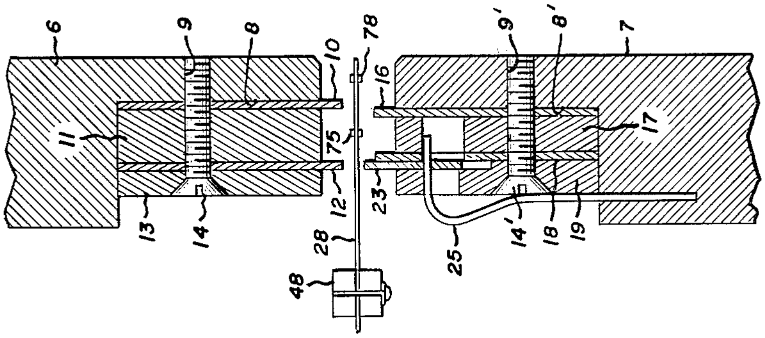
Figure 6B:
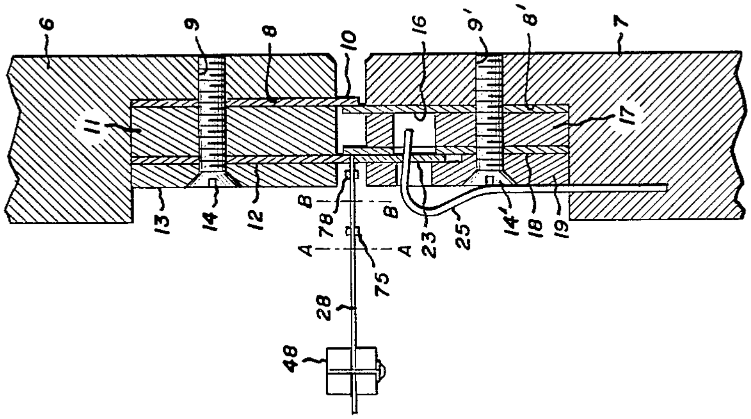
Figure 6A:
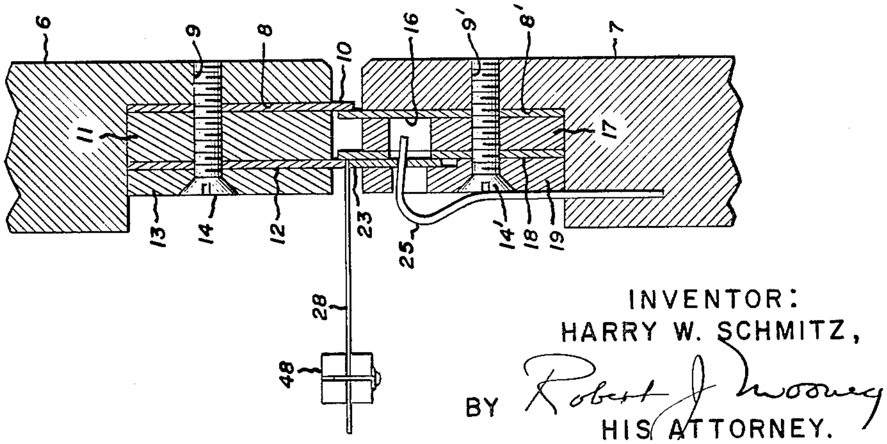

In FIG. 6*c*, the spring 25 is in its normal position, resiliently urging the wire clamping element 23 to its extended, or forward position projecting beyond the cutting surfaces of the cutting blades 16 and 18. FIGS. 6*a*, 6*b* and 6*d* show the wire clamping element 23 abutting blade 12 and forced to a retracted or rearward position behind the cutting surfaces of the cutting blades 16 and 18, the lost motion of the clamping element 23 provided by its sliding movement within channel 24, being taken up. There is thus provided both a resilient biasing or urging of the wire clamping element 23 to the extended or forward position and a resilient lost motion of the wire clamping element 23 from the extended or forward, to the retracted or rearward position.

*Carriage.*—The carriage 1 in FIG. 1 is seen, in greater detail, to comprise a base member 29, a left actuator 30, and a right actuator 31. The left and right holders 6 and 7, as indicated by hidden lines, extend through apertures provided in the left and right actuators 30 and 31, respectively, and in the base member 29. In addition, a left control rod 32 and a right control rod 33, likewise indicated by hidden lines, pass through apertures provided in the left and right actuators 30 and 31, respectively, and in the base member 29. The left holder 6 and the left control rod 32 are secured to the left actuator 30 by any suitable connecting means, such as set screws 32′. Similarly, the right holder 7 and the right control rod 33 are connected to the right actuator 31 by set screws 32′. Sealing means 34 are provided on the interior ends of the left and right control rods 32 and 33 to provide a sealed chamber 35. For the purpose of actuating the clamping and cutting mechanism 2 to its disengaged position, as shown in FIG. 6*c*, an air cylinder 36 communicates with the chamber 35 to actuate the left and right control rods 32 and 33 for displacing the left and right actuators 30 and 31 and holders 6 and 7 to the position indicated by the dotted lines 30′ and 31′, respectively.

The broken away portion of the left actuator 30 in FIGS. 1 and 2 shows the return mechanism of the actuators 30 and 31 for actuating the cutter mechanism to its engaged position, as shown in FIG. 6*a*. The return mechanism is identical for both the left and the right actuators 30 and 31 and therefore reference will be had only to the left actuator 30. An aperture 37 is provided in the left actuator 30, an inwardly extending shoulder 38 and a further inwardly extending shoulder 39 being formed therein. Screw member 40 is received within the aperture 37 and is threadedly engaged in the base member 29 and secured therein by set screw 41. Spring member 42 abuts against the inwardly extending shoulder 39 and the interior side of the head of screw member 40. The inwardly extending shoulder 38 also abuts the interior side of the head of screw member 40 to limit the extent of travel of the left actuator 30 upon energization of air cylinder 36. Thus, the screw member 40 provides a control of the extent to which the clamping and cutting mechanism 2 is disengaged and, in addition, provides a stationary surface relative to the base member 29 for compressing the spring 42. Upon deenergization of the air cylinder 36, the spring 42 will return the actuators 30 and 31 to their original positions as shown in solid lines for actuating the clamping and cutting mechanism 2 to its engaged position.

In addition to providing the mechanism for engaging and disengaging the clamping and cutting mechanism 2, the carriage 1 is also arranged for reciprocation between a first and a second laterally spaced position by the apparatus shown in FIG. 4 to withdraw the predetermined length of wire from a wire source 43. Mounting plate 44 also shown in FIGS. 1 and 2, includes a horizontally extending arm 45 and a depending portion 46 to which is attached a housing 47 for a wire source 43. The wire 28 extends from the wire source 43 through a feed support 48 to be received within the clamping and cutting mechanism 2, as indicated more clearly in FIGS. 5 and 6*a*–6*d*.

Providing sliding support for lateral motion of carriage 1 are guide rods 49 and 50, shown in FIGS. 1 and 2, which are mounted on the mounting plate 44 and are received in sliding engagement within apertures provided in the base member 29 of the carriage 1. Double acting air cylinder 51 is suitably connected to the mounting plate 44 and extends through the mounting plate 44, is indicated by the hidden lines 52. Actuating arm 53 of the air cylinder 51 is connected to the carriage 1 and is extended or retracted upon appropriate energization of the air cylinder 51. A set screw 54 with a lock nut 55 is provided in the depending portion 46 of the mounting plate 44 for limiting the extent of motion of the carriage 1.

The dotted line 56 represents the edge of the carriage 1 when actuated to its first position by the air cylinder 51. Actuation of the carriage 1 to this first position effects a translation of the clamping and cutting mechanism 2 to its first or wire clamping position, as shown in FIGS. 6*a*, 6*c*, and 6*d*. Alternate energization of the air cylinder 51 moves the carriage 1 laterally to its second position, as indicated by the solid lines of the carriage 1 in FIG. 4, and is also indicated in FIG. 6*b*.

TRANSPORT MECHANISM AND GRASPING MEANS

As seen in FIGS. 1 and 2, and in a perspective view in FIG. 7, the transport mechanism 3 comprises a support rod 57 which is slidingly received within an aperture provided in rotatable support mount 58. The rotatable support mount 58 is rotatably mounted on the mounting plate 44 by shaft 59, shown by hidden lines in FIGS. 1 and 2, and shown more clearly in FIG. 7. A left support 60 and a right support 61 are secured to the support rod 57 by securing means, such as set screws 62.

Air cylinder 63, which provides a control means for the grasping means 4, as will appear more fully hereinafter, is received within an aperture in the left support 60 and is secured thereto by a set screw 63'. The air cylinder 63 has an extending arm 64 to which is connected a mounting block 65 provided with an adjusting means such as set screw 66. Extending from the mounting block 65 is an actuating arm 67 which actuates the grasping means.

As shown more clearly in the perspective view of FIG. 7 and in the enlarged view of FIGS. 8*a*, 8*b* and 8*c*, the actuating arm 67 extends within mounting block 68, which is attached to the right support 61, for connection to control rods 69 and 70. The control rods 69 and 70 pass through rotatable sleeves 71 and 72 which are received within apertures provided in the mounting block 68. Attached to the rotatable sleeve 71 is a grasping means 4 which comprises oppositely disposed spring-like members including on opposite sides thereof first portions 73 attached to the rotatable sleeve 71, inwardly extending portions 74 and duck-billed tweezer portions 75, the portions 75 being resiliently biased into engagement. A grasping means 4, including first portions 76, inwardly extending portions 77, and duck-billed tweezer portions 78 are provided on the rotatable sleeve 72 in an identical fashion.

In FIGS. 8*a* and 8*b* the duck-billed tweezer portions 75 and 78 are shown in a normally closed condition for effecting a grasping function. In FIG. 8*c* air cylinder 63 has been energized for causing actuating arm 67 to move forward, thereby causing control rods 69 to extend and abut the inwardly extending portions 74, moving the duck-billed tweezer portions 75 to an open condition for effecting a releasing function. In an identical fashion, actuating arm 67 causes control rod 70 to extend and abut the inwardly extending portion 77 for moving the duck-billed tweezer portions 78 to an open condition. Set screw 66 provides adjustment of the position of actuating arm 67 for precise abutting engagement of the control rods 69 and 70 with the inwardly extending portions 74 and 78, respectively.

As shown in FIGS. 9 and 10, the grasping means 4, and more precisely the tweezer portion 75 having a grasping axis X—X and the tweezer portion 78 having a grasping axis Y—Y, are normally held by the rotatable sleeves 71 and 72 to effect an equiangular disposition of the grasping axes X—X and Y—Y relative to a plane H—H. In FIGS. 9 and 10 the duck-billed tweezer portions 75 are shown in their closed condition, grasping a wire portion A, and the duck-billed tweezer portions 78 are likewise shown in their closed condition, grasping a wire portion B. The desirability of providing the angular disposition of the grasping axes X—X and Y—Y may be appreciated by reference to FIG. 11 wherein the duck-billed tweezer portions 75 are grasping a wire portion A to support it adjacent a semiconductor pellet 79 for bonding thereto by bonding apparatus 80. The wire portion B, supported by the tweezers 78 (not shown in FIG. 11) has previously been bonded to the pellet 79, as indicated at the region 81. Thus, the angular disposition of the wire portion A relative to the bonding region 82 permits a convenient relationship of the wire portion A when employing the bonding apparatus 80. In addition, the angular disposition of the bonded wire, as represented by the bonded wire portion B, facilitates further electrical interconnection of the free end of the bonded wire, such as wire portion B, to external terminals on a header assembly (not shown).

Referring again to FIG. 10, the degree of enlargement of the duck-billed tweezer portions 75 and 78 may be appreciated by a realization that the actual size of a given one of the duck-billed tweezer portions 75 or the duck-billed tweezer portions 78 is approximately four mils in width parallel to the grasping axis X—X, or Y—Y, and two mils in thickness in a direction transverse to the grasping axis X—X, or Y—Y. The duck-billed configuration, however, provides a firm grasping of the wire, enabling the transporting and angular positioning of the wire portions A and B.

When the grasping means 4 is positioned adjacent the wire clamping and cutting mechanism 2 as in FIG. 1, it is necessary that the grasping axes X—X and Y—Y be aligned. Thus, a rotation of the tweezers 75 and 78 must be effected, and this is achieved by rotation of the rotatable sleeves 71 and 72 during movement of the grasping means 4 to the position shown in FIGURE 1. For this purpose there is provided, as seen in FIGS. 8*a* and 9, a crank arm 83 on the rotatable sleeve 71 and a crank arm 84 on the rotatable sleeve 72, the crank arms 83 and 84 being received within slots 85 on control plate 86. As shown in FIG. 9, when the control plate 86 is positioned as indicated by the dotted line 86', the slots will be in the positions indicated by the dotted lines 85', thereby rotating the sleeves 71 and 72 to effect an alignment of the grasping axes X—X and Y—Y parallel to the horizontal plane H—H. Further, as shown in FIG. 8*a* and more clearly in FIG. 7, the control plate 86 is provided with an aperture 87 through which extends a leaf spring 88, the leaf spring 88 being secured to the left support 60 of the transport mechanism 3 by mounting means such as screws 88'. Leaf spring 88 is normally biased toward an upward position relative to the right support 61, thereby maintaining the grasping means 4 at the angular disposition as indicated in FIGS. 8*a*, 8*b* and 9 through 11.

When the transport mechanism 3 is being actuated to position the grasping means 4 adjacent the clamping and cutting mechanism 2, as indicated in FIG. 1, during the last portion of such movement the leaf spring 88 abuts spring stop 89, thereby displacing the control plate 86 to the dotted line position 86' of FIG. 9 for effecting an alignment of the grasping axes X—X and Y—Y.

The transport mechanism 3 is actuated by air cylinder 90 which is provided with an actuating arm 91 pivotally connected to a lever arm 93 by shaft 92. The lever arm 93 and a crank arm 94 are joined securely to shaft 95, the shaft 95 being rotatably received within the passing through an aperture in the mounting plate 44. The crank arm 94 is pivotally connected to the right support 61 by shaft 96.

Upon appropriate energization of the air cylinder 90, the crank arm 94 is rotated, causing the support rod 57 to slide within the aperture in the rotatable support mount 58. When the grasping means 4 is positioned at the clamping and cutting mechanism 2, the support rod 57 is related tangentially to the arc of the circle through which the shaft 96 moves during rotation of crank arm 94, whereby the transport mechanism 3 initially is moved in a substantially rectilinear fashion. This rectilinear movement of the duck-billed tweezer portions 75 and 78 in the region closely adjacent the clamping and cutting mechanism 2 facilitates their insertion into the extremely minute interstices existing between the cutting blades of the clamping and cutting mechanism 2 and in straddling or wire-receiving relation therewith for grasping the predetermined length of wire comprising the wire portions A and B, and further facilitates smooth withdrawal of the cut wire segments from between the blades without bending or other mutilation of the wire segments. Continued rotation of the crank arm 94 then effects substantially a rotation of the support rod 57 and the rotatable support mount 58 for translating the transport mechanism 3 and the grasping means 4 to the bonding station 5. During the initial portion of such rotative movement of rod 57, pressure of stop 89 on spring 88 is relieved and the axes X—X and Y—Y of the grasping means 4 returns to the angular disposition as shown in FIGURE 10. In the region closely adjacent the bonding station 5, the support rod 57 is again tangentially related at the shaft 96 to the circle of rotation of the crank arm 94. Thus, the support rod 57 again slides within the rotatable support mount 58, effecting a substantially rectilinear motion of the transport mechanism 3 for positioning the grasping means 4 at the bonding station 5.

FIG. 3 indicates the stop mechanisms which are provided for accurate control of the degree of motion of the transport mechanism 3. Actuating arm 91 has been retraced by air cylinder 90 to rotate lever arm 93 to position the transport mechanism 3 at the bonding station 5 as shown in FIG. 2. Flat edge 97 of the lever arm 93 abuts an end of set screw 98, the set screw 98 being threadedly received within mounting block 99 which is connected to the mounting plate 44 by screws 100. Set screw 98 is adjusted to accurately control the extent of rotation of crank arm 93 for precisely positioning the grasping means 4 at the clamping and cutting mechanism 2. Lock nut 101 secures the set screw 98 in position after the desired adjusting is achieved. Similarly, when transport mechanism 3 has been actuated to position the grasping means 4 at the bonding station 5, as shown in FIG. 1, flat edge 102 of lever arm 93 abuts an end of set screw 103, the set screw 103 being threadedly received within mounting block 104 which is connected to the mounting plate 44 by screws 100. Set screw 103 is adjusted to provide precise positioning of the grasping means 4 at the bonding station 5. Lock nut 105 secures the set screw 103 in position after the desired adjusting is achieved.

BONDING STATION

With reference to FIG. 7, the apparatus provided at the bonding station 5 includes a heated anvil 106 over which a strip carrier 107 passes, the strip carrier preferably being unwound from and rewound onto a single supply drum 108. Mounted on the strip carrier 107 are a plurality of semiconductor pellets 79, a single one of which is shown more clearly in FIG. 11. Following each bonding operation, the supply drum is automatically indexed for advancing the strip carrier 107 the correct distance to position a subsequent semiconductor pellet at the bonding station.

Although the machine of the invention is applicable for numerous types of bonding operations, the one here depicted is that of thermal compression bonding. Heated anvil 106 serves to raise the temperature of the semiconductor pellets sufficiently that upon the application of pressure by bonding apparatus 80 between the wire portions A or B and the related bonding region, 82 or 81, a thermal compression bond is effected.

In the event of slight misalignments of the pellets 79 on the carrier 107, the pellets 79 may not be located in precisely the position required for complete accuracy in the relative positioning of the wire portions A and B at the appropriate regions (e.g., 81 and 82) of the pellet 79 to which the wire portions are to be bonded. A pantographic or other X—Y—Z positioning control may therefore be employed for effecting minute relative movement of the anvil 106 and pellet 79 relative to the wire handling apparatus heretofore described, so as to bring the wire portions into the precisely correct bonding positions relative to the pellet 79. Such a control is well known in the art and is therefore not shown herein. Due to the minute size of the wire portions A and B and the regions 81 and 82, a suitable vision aid such as a binocular microscope (not shown) is provided for viewing the elements at the bonding station while operating the pantographic or other suitable vernier relative positioning control and the bonding apparatus 80.

OPERATION

The cycle of operation of the apparatus above described begins in response to an initial signal which may be from an operator-controlled switch or may be automatically provided in response to the indexing of a semiconductor body into the lead bonding station on the heated anvil 106. At the start of the machine cycle the transport mechanism 3 is in the downward or delivery position as shown in FIG. 2 and the wire clamping and cutting mechanism 2 is in the position shown in FIG. 6*a*. In FIG. 6*a*, the clamping and cutting mechanism 2 is in its first or wire clamping position, corresponding to the first or left hand position of the laterally reciprocable carriage 1 indicated by the dotted line 56 in FIG. 4. The actuators 30 and 31, respectively, are in the positions indicated by solid lines in FIGS. 1 and 2, actuating the clamping and cutting mechanism 2 to its engaged position and causing the wire clamping element 23 to clamp the free end of the wire 28 against the front surface of the cutting blade 12. In this engaged position of the clamping and cutting mechanism 2, the cutting blades 16 and 18 are interengaged in a shearing relationship with the cutting blades 10 and 12, respectively.

When the machine begins, air cylinder 51 is energized and translates the carriage 1 to its second position, indicated by the solid lines in FIG. 4, thus drawing a predetermined length of wire from the supply spool 43. The clamping and cutting mechanism 2 is likewise translated to its second position, indicated in FIG. 6*b*. The dotted lines A—A and B—B represent, respectively, the shearing interfaces of the cutting blades 12 and 18, and the cutting blades 10 and 16, when the clamping and cutting mechanism is in its first position, indicated in FIG. 6*a*. Thereafter, and while clamp 23 continues to hold the wire precisely in predetermined position, the transport mechanism 3 is actuated to move the grasping means 4 up to the vicinity of the clamping and cutting mechanism 2. The substantially rectilinear nature of the last portion of the motion of the grasping means 4, and the alignment of the grasping axes X—X and Y—Y of the duck-billed tweezer portions 75 and 78 by the abutting of the leaf spring 88 against the spring stop 89, enables the respective duck-billed tweezer portions 75 and 78 to straddle the wire portions A and B in wire receiving relation. The duck-billed tweezer portions 75 and 78 are initially positioned in their open condition so as to be in wire straddling or receiving relation, and are actuated subsequently by air cylinder 63 to their closed condition so as to firmly grasp the wire portions A and B, respectively. Once the duck-billed tweezer portions 75 and 78 engage and support the wire 28, the clamping and cutting mechanism 2 is released and actuated to its disengaged position by energization of air cylinder 36 and returned to its first position by energization of air cylinder 51, the relative positioning of the elements at this time being shown in FIG. 6*c*.

The two wire portions A and B are then cut to length by de-energization of air cylinder 36, whereby spring members 42 return the actuators 30 and 31 to the solid line position of FIG. 1 to actuate the clamping and cutting mechanism 2 to its engaged position. During the actuation to the engaged position, shown in FIG. 6*d*, the clamping element 23 initially clamps the wire 28 against the front surface of cutting blade 12 at a position adjacent the predetermined length of wire comprising the wire portions A and B. As the lost motion of the clamping element 23 is taken up, the cutting blades 10 and 12 and the cutting blades 16 and 18 are moved into shearing interengagement to cut, respectively, the predetermined length of wire comprising the wire portions A and B from the wire 28 of the wire source 43 and to cut the predetermined length of wire into separate portions, A and B.

Following the cutting of the wire portions A and B from the wire 28 of the wire source 43, the duck-billed tweezer portions 75 and 78 are withdrawn from the clamping and cutting mechanism 2 by actuation of the transport mechanism 3. The substantially rectilinear initial portion of the motion of the grasping means 4 in the region adjacent the clamping and cutting mechanism 2, provided by the sliding motion of the support rod 57 of the transport mechanism 3 within the rotatable mounting block 58, facilitates the withdrawal of the duck-billed tweezer portions 75 and 78 from between the cutting blades without in any way bending or otherwise damaging the wire portions A and B.

Further movement of the transport mechanism 3 by the air cylinder 90 effects a rotation of the transport mechanism 3 with the rotatable mounting block 58 to bring the grasping means 4 down to its wire delivery position adjacent the bonding station 5. Thus in a single delivery motion the transport mechanism brings both precut lead wires A and B down into the visual field of the operator's binocular microscope or other suitable vision aid at the bonding station. During the rotation of the transport mechanism 3, the pressure imparted upon the leaf spring 88 by the spring stop 89 is terminated and the leaf spring 88 returns to its normal position, thereby rotating the grasping means 4, and, more explicitly, the duck-billed tweezer portions 75 and 78 to effect an equiangular disposition of the grasping axes X—X and Y—Y relative to the horizontal plane H—H as shown in FIGS. 9 and 10. Thus at wire delivery position at the bonding station 5, the duck-billed tweezer portions are automatically positioned by the transport mechanism 3 to support the wire portions A and B, respectively, with their attached ends properly oriented and precisely located adjacent the contact regions of semiconductor pellet 79 for subsequent bonding. The bonding of each wire portion is then accomplished by any desired technique, such as thermal compression by tool 80, vernier relative movement of pellet 79 and wires A and B being operator controlled. Once the first lead is bonded, vernier relative movement necessary to position the second lead is accommodated by slippage of the bonded wire in its tweezer, without damage to the wire. After both leads are bonded, indexing of pellet 79 removes the leads from both tweezers and the apparatus is ready to recycle.

It will be evident that apparatus constructed according to the invention has a number of important advantages in terms of reducing manufacturing cost, reducing lead wire attachment time, minimizing operator effort and fatigue, and enhancing product uniformity and quality. Once the semiconductor body is indexed into position for lead attachment, generally within the greatly magnified but physically minute field of view of the operator's microscope or other vision aid, all that the operator has to do is trip the hand, foot, or other suitable control switch to initiate the machine cycle and the machine automatically delivers both leads simultaneously, automatically pre-cut to proper length, into the field of view of the operator and properly oriented and located for attachment to the semiconductor contact regions. Thus the operator is completely free of the additional diverting and fatiguing tasks of wire delivering and wire cutting required with prior art apparatus. Moreover, the apparatus of the present invention holds the tiny lead wire portions firmly at all times until they are bonded or until they are attached to the pellet, thereby minimizing danger or waste of the expensive lead wire material. Finally, the apparatus has a very swift cycle time of the order of a second or two and this factor together with the minimum operator effort required greatly increases the rate of pellet lead attachment in production operations, with attendent reduction in manufacturing cost, while preserving uniformly high quality. For example, machines such as above described have been found in production to provide a ten-fold increase in lead attachment rate per operator from an approximate level of 60 leads attached per hour by prior art equipment to an approximate rate in excess of 600 leads attached per hour with equipment according to my invention.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description but will be defined in the following claims.

What I claim as new and desire to secure by Letters Patent of the United States is:

1. In apparatus for attaching electrode leads to contact regions of semiconductor devices fed to a lead attachment station, means for intermittently advancing a supply of lead wire into a lead cutting station spaced from said lead attachment station, a lead transport mechanism including a pair of spaced openable and closable lead wire gripping tweezers movable between a lead delivery position adjacent the lead attachment station and a lead acquisition position adjacent said lead cutting station, means associated with said transport mechanism for moving the jaws of said tweezers into lead wire receiving relation during movement of said tweezers toward said acquisition position and closing the jaws of said tweezers upon arrival at said acquisition position, and cutter means for severing to predetermined lead lengths from the supply of said wire the increments of lead wire gripped by said tweezers.

2. In apparatus for attaching electrode leads to contact regions of semiconductor devices fed to a lead attachment station, means for intermittently advancing a supply of lead wire into a lead cutting station spaced from said lead attachment station, a lead transport mechanism including a pair of spaced openable and closable lead wire gripping tweezers movable between a lead delivery position adjacent the lead attachment station and a lead acquisition position adjacent said lead cutting station, means associated with said transport mechanism for moving the jaws of said tweezers into lead wire receiving relation during movement of said tweezers toward said acquisition position and closing the jaws of said tweezers upon arrival at said acquisition position, cutter means for severing to predetermined lead lengths from the supply of said wire the increments of lead wire gripped by said tweezers, and means for driving said lead transport mechanism including means for imparting a rectilinear motion to said tweezers during final approach to and initial departure from said lead acquisition position.

3. In apparatus for attaching electrode leads to contact regions of semiconductor devices fed to a lead attachment station, reciprocable clamping means for intermittently advancing a supply of lead wire a predetermined length into a lead cutting station spaced from said lead attachment station, a lead transport mechanism including a pair of spaced openable and closable lead wire gripping tweezers movable between a lead delivery position adjacent the lead attachment station and a lead acquisition position adjacent said lead cutting station, cam means associated with said transport mechanism for moving the jaws of said tweezers into lead wire receiving relation during movement of said tweezers toward said acquisition position and closing the jaws of said tweezers upon arrival at said acquisition position, cutter means for severing to predetermined lead lengths from the supply of said wire the increments of lead wire gripped by said tweezers, means for driving said lead transport mechanism including a slidable support for imparting a rectilinear motion to said tweezers during final approach to and initial departure from said lead acquisition position, and means responsive to movement of said tweezers to said delivery position for relatively rotating said tweezers to relatively angularly dispose the leads gripped thereby.

4. A method of high-speed precision forming and delivery of semiconductor wire leads to a lead attachment station for attachment to contact regions of a semiconductor pellet comprising:

(a) clamping a free end of lead wire from a lead wire source,
(b) translating said free end to withdraw a predetermined length of wire from the wire source,
(c) grasping said predetermined length of wire at spaced locations intermediate the ends of increments of desired lead length,
(d) releasing said free end and clamping the wire at a point between said predetermined length of wire and said source,
(e) cutting said predetermined length of wire into said grasped increments of desired length,
(f) transporting said grasped increments of wire to said lead attachment station, and
(g) relatively angularly orienting said increments of wire during transport thereof to said attachment station.

5. A precision, high-speed apparatus for forming and delivering electrode leads for attachment to a semiconductor pellet comprising:

(a) a wire supply apparatus including a clamping and cutting mechanism adapted to receive a wire from a wire source,
(b) means for translating said clamping and cutting mechanism from a first position to a second position to draw a predetermined length of wire from the wire source to a cutting station and for returning said clamping and cutting mechanism to said first position,
(c) means for actuating said clamping and cutting mechanism to a disengaged position at said second position to release the wire and for actuating said clamping and cutting mechanism to an engaged position at said first position to clamp the wire adjacent said predetermined length prior to cutting and to cut said predetermined length from the wire source,
(d) a transport mechanism for moving said predetermined length of wire between said cutting station and an attachment station, said transport mechanism including grasping means movable between said cutting station and said attachment station,
(e) means for actuating said grasping means into firmly gripping engagement with an intermediate portion of said predetermined length of wire to be cut prior to cutting thereof, and means for actuating said grasping means to an open condition when positioned at said attachment station for releasing said predetermined length of wire and means for moving said grasping means relative to said transport mechanism during movement of said transport mechanism to said attachment station to present the cut length of wire gripped thereby to said attachment station with a desired orientation.

6. A precision high-speed wire handling machine providing conducting leads for bonding to a semiconductor pellet as recited in claim 5, wherein said clamping and cutting mechanism includes:

(a) a first holder and a first cutting blade, said cutting blade being mounted on said first holder,
(b) a second holder and a second cutting blade, said second cutting blade being mounted on said second holder,
(c) a clamping element slidingly mounted on one of said holders, said clamping element being arranged for actuation between a forward position and a rearward position, said clamping element in its forward position extending beyond the cutting surface of the cutting blade mounted on said one of said holders and in its rearward position lying behind the cutting surface of said cutting blade mounted on said one of said holders,
(d) resilient means urging said clamping element to its forward position in said disengaged position of said clamping and cutting mechanism,
(e) a clamping surface provided on the other one of said holders, said clamping element engaging said clamping surface for clamping a wire therebetween and for moving said clamping element to said rearward position against the urging of said resilient means in said engaged position of said clamping and cutting mechanism.

7. Apparatus as recited in claim 5 wherein said grasping means includes a pair of duck-billed tweezers, said tweezers having opposed resilient jaws normally resiliently urged into mutual engagement, and jaw opening cam means associated with said tweezers including pins rectilinearly slidable between the shank ends of the respective pairs of jaws.

8. Apparatus as recited in claim 7 wherein said grasping means includes a support for each of said tweezers comprising a rotatable sleeve and wherein means are provided for relatively rotating said sleeves to effect a relative rotation of the grasping axis of said tweezers.

9. Apparatus as recited in claim 5 wherein said grasping means comprises:

(a) a first rotatable sleeve having an angularly extending crank arm,
(b) first opposed elements, said first opposed elements being mounted on said first rotatable sleeve and being resiliently urged into grasping engagement for actuating said grasping means to a closed condition,
(c) a second rotatable sleeve having an angularly extending crank arm,
(d) second opposed elements, said second opposed elements being mounted on said second rotatable sleeve and being resiliently urged into grasping engagement for actuating said grasping means to a closed condition,
(e) and actuating means for said crank arms operable responsive to movement of said transport mechanism to said cutting station to rotate said sleeves and align the grasping axes of said first and said second opposed elements, said actuating means being operable responsive to movement of said transport mechanism to said attachment station to effect a dihedral disposition of the grasping axes of said first and said second opposed elements.

10. A precision high-speed wire handling machine providing conductor leads for bonding to a semiconductor pellet comprising:

(a) a wire supply apparatus including a clamping and cutting mechanism adapted to receive a wire from a wire source, (b) said clamping and cutting mechanism including:

(b1) a first holder and a second holder, each of said holders supporting two cutting blades thereon at displaced positions, each of said cutting blades on said first holder being arranged for actuation to shearing interengagement with one of said cutting blades on said second holder to provide two displaced positions of shearing interengagement, (b2) a clamping element, said clamping element being slidingly mounted on one of said holders adjacent one of said cutting blades on said one of said holders and parallel thereto and arranged for actuation between a forward and a rearward position, and, (b3) resilient means urging said clamping element to said forward position, (c) means for translating said clamping and said cutting mechanism from a first position to a second position to withdraw a predetermined length of wire from the wire source and for returning said clamping and cutting mechanism to said first position, (d) means for actuating said clamping and said cutting mechanism, (d1) to a disengaged position at said second position for releasing the wire, and (d2) to an engaged position at said first position for engaging said clamping element with the front surface of one of said cutting blades on the other of said holders to clamp the wire therebetween at a position adjacent said predetermined length and for moving said clamping element to said rearward position against the urging of said resilient means, and for moving said cutting blades into said shearing interengagement at said displaced positions to cut said predetermined length of wire from said wire source and to cut said predetermined length of wire into two portions, (e) a transport mechanism for moving said two portions of said predetermined length of wire between said wire supply apparatus and a bonding station, said transport mechanism including grasping means movable between said wire supply apparatus and said bonding station, (f) said grasping means including:

(f1) first opposed elements mounted on a first rotatable support means and second opposed element mounted on a second rotatable support means, said first and second opposed elements being resiliently biased into engagement for actuating said grasping means to a closed condition when positioned at said clasping and cutting mechanism for grasping said portions of said predetermined length of wire, (f2) actuating means for rotating said rotatable support means to effect selectively an alignment or a dihedral disposition of the grasping axes of said opposed elements, and (f3) actuating means comprising a control rod extending through said rotatable support means for abutting engagement with said opposed elements for actuating said grasping means to an open condition when positioned at said bonding station for releasing said portions of said predetermined length of wire.

References Cited by the Examiner

UNITED STATES PATENTS

| | | | |
|---|---|---|---|
| 1,897,970 | 2/1933 | Hofmann et al. | 83—277 |
| 2,831,684 | 4/1958 | Cundall | 83—154 X |
| 3,018,679 | 1/1962 | Crowely et al. | 83—154 |
| 3,072,002 | 1/1963 | Kuba | 83—277 X |
| 3,165,207 | 1/1965 | Campbell et al. | 83—154 X |
| 3,184,947 | 5/1965 | Erskine et al. | 83—277 X |

WILLIAM W. DYER, Jr., *Primary Examiner.*

J. M. MEISTER, *Assistant Examiner.*